United States Patent
Park et al.

(10) Patent No.: US 9,152,816 B2
(45) Date of Patent: Oct. 6, 2015

(54) METHOD OF MANAGING MEDICAL INFORMATION IN OPERATING SYSTEM FOR MEDICAL INFORMATION DATABASE

(71) Applicant: Electronics and Telecommunications Research Institute, Daejeon (KR)

(72) Inventors: Hanna Park, Seoul (KR); Done Sik Yoo, Daejeon (KR); Seunghwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 28 days.

(21) Appl. No.: 14/014,251

(22) Filed: Aug. 29, 2013

(65) Prior Publication Data

US 2014/0068255 A1 Mar. 6, 2014

(30) Foreign Application Priority Data

Aug. 31, 2012 (KR) .................. 10-2012-0096773

(51) Int. Cl.
*H04L 29/06* (2006.01)
*G06F 21/62* (2013.01)

(52) U.S. Cl.
CPC ........ *G06F 21/6218* (2013.01); *G06F 21/6245* (2013.01)

(58) Field of Classification Search
CPC ............................. G06F 21/62; G06F 21/6218
USPC ............................ 713/165, 171; 380/277, 282
See application file for complete search history.

(56) References Cited

U.S. PATENT DOCUMENTS

| | | | | |
|---|---|---|---|---|
| 7,587,368 | B2 * | 9/2009 | Felsher | 705/65 |
| 8,380,630 | B2 * | 2/2013 | Felsher | 705/50 |
| 2003/0039362 | A1 * | 2/2003 | Califano et al. | 380/283 |
| 2005/0165623 | A1 * | 7/2005 | Landi et al. | 705/2 |
| 2006/0041533 | A1 * | 2/2006 | Koyfman | 707/3 |
| 2006/0190742 | A1 * | 8/2006 | Ebitani et al. | 713/193 |
| 2009/0113213 | A1 * | 4/2009 | Park et al. | 713/189 |
| 2009/0193267 | A1 * | 7/2009 | Chung | 713/193 |
| 2011/0004607 | A1 * | 1/2011 | Lokam et al. | 707/759 |
| 2014/0129836 | A1 * | 5/2014 | Ogawa | 713/168 |

FOREIGN PATENT DOCUMENTS

| | | |
|---|---|---|
| KR | 10-1998-0044525 A | 9/1998 |
| KR | 10-2005-0099751 A | 10/2005 |
| KR | 10-2005-0112943 A | 12/2005 |
| KR | 10-2007-0047244 A | 5/2007 |
| KR | 10-2008-0035295 A | 4/2008 |
| KR | 10-2009-0041545 A | 4/2009 |

* cited by examiner

*Primary Examiner* — Samson Lemma

(57) ABSTRACT

Provided is a method of managing medical information in an operating system for a medical information database, the method including encrypting, by a first user, first medical information having patient treatment information by using a group key, and second medical information having patient private information by using a private key, generating, by the first user, an index corresponding to the encrypted first medical information, storing the encrypted first and second medical information and the index to the medical information database, searching, by a second user, the medical information database for the encrypted first medical information by using the index; and decrypting the searched encrypted first medical information by using the group key.

8 Claims, 2 Drawing Sheets

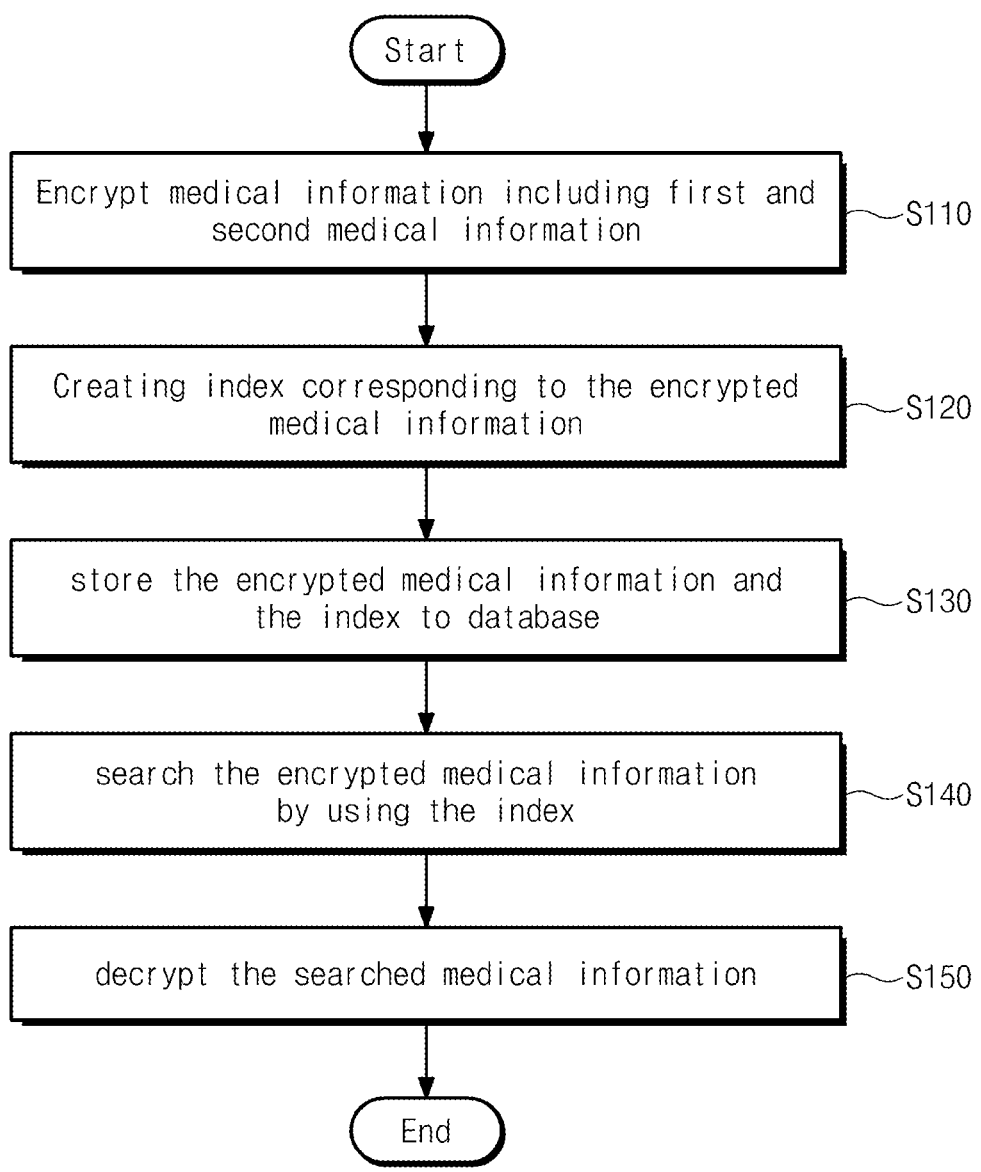

METHOD OF MANAGING MEDICAL INFORMATION IN OPERATING SYSTEM FOR MEDICAL INFORMATION DATABASE

CROSS-REFERENCE TO RELATED APPLICATIONS

This U.S. non-provisional patent application claims priority under 35 U.S.C. §119 of Korean Patent Application No. 10-2012-0096773, filed on Aug. 31, 2012, the entire contents of which are hereby incorporated by reference.

BACKGROUND OF THE INVENTION

The present invention disclosed herein relates to a method of managing medical information in an operating system for a medical information database.

As paper-based medical records become digitalized by introducing electronic medical records (EMR) and an order communication systems (OCS), management of a medical information database highly attracts interests. Even though medical information including sensitive, privacy-related information requires to be encrypted, since not all the information is sensitive, an active encryption method reflecting characteristics of the medical information is necessary. Also, as evidence-based medicine (EBM) is developed, it is required to effectively search a medical information database for medical information for clinical research.

Typically, since a medical information database locates within a hospital, there is no separate protection measure on medical information therein or all medical information is encrypted with a symmetric-key cryptosystem. In the search, all encrypted medical information is read, decrypted, and then searched, and, in this process, there is a risk of information leaks by an inner manger.

Accordingly, the search is necessary to be enabled in an encrypted state without decryption for security and efficient commerciality. For this, database encryption and search schemes are being researched, which mainly focus on a system for selecting representative keywords from a document, encrypting them and using the encrypted keywords as indexes for a search. Since a medical information database is accessed by users in various groups such as doctors, nurses, or the persons related to hospital management, the group users are to be considered. Accordingly, typical database encryption and search schemes have limitations in applying to medical information databases, since they do not consider characteristics of medical information and lack consideration for various group users.

SUMMARY OF THE INVENTION

The present invention provides a method of managing medical information in an operating system for a medical information database, which considers a group user environment of the medical information database and reflects characteristics of medical information.

Embodiments of the present invention provide methods of managing medical information in an operating system for a medical information database, the methods comprising: encrypting, by a first user, medical information having patient treatment information by using a group key, and second medical information having patient private key by using a private key; generating, by the first user, an index corresponding to the encrypted first medical information; storing the encrypted first and second medical information and the index to the medical information database; searching, by a second user, the medical information database for the encrypted first medical information by using the index; and decrypting the searched encrypted first medical information by using the group key.

In some embodiments, the first and second users may respectively perform authentication by inputting an ID and a password through an input window.

In other embodiments, the patient treatment information may include diagnosis, prescription, a hospitalization date, a hospital discharge date, or a disease code, and the patient private information may include a name, an age, a phone number, a resident registration number, an address, or a patient ID.

In still other embodiments, the second user may be identical to the first user, and the first user may decrypt the encrypted second medical information by using the private key.

In even other embodiments, the index may be encrypted by using the private key.

In yet other embodiments, the medical information may further include other information besides the first and second medical information, and the other information may be encrypted with the group key, the encrypted other information may be stored in the medical information database, and the encrypted other information may be decrypted by using the group key.

In further embodiments, the other information may include hospital administration information.

In still further embodiments, the hospital administration information may include all certificate management information, treatment fee management and health insurance practice, and hospital administration statistics.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 2 is flowchart illustrating an exemplary method of managing medical information according to an embodiment of the present invention.

DETAILED DESCRIPTION OF PREFERRED EMBODIMENTS

Figure 1:
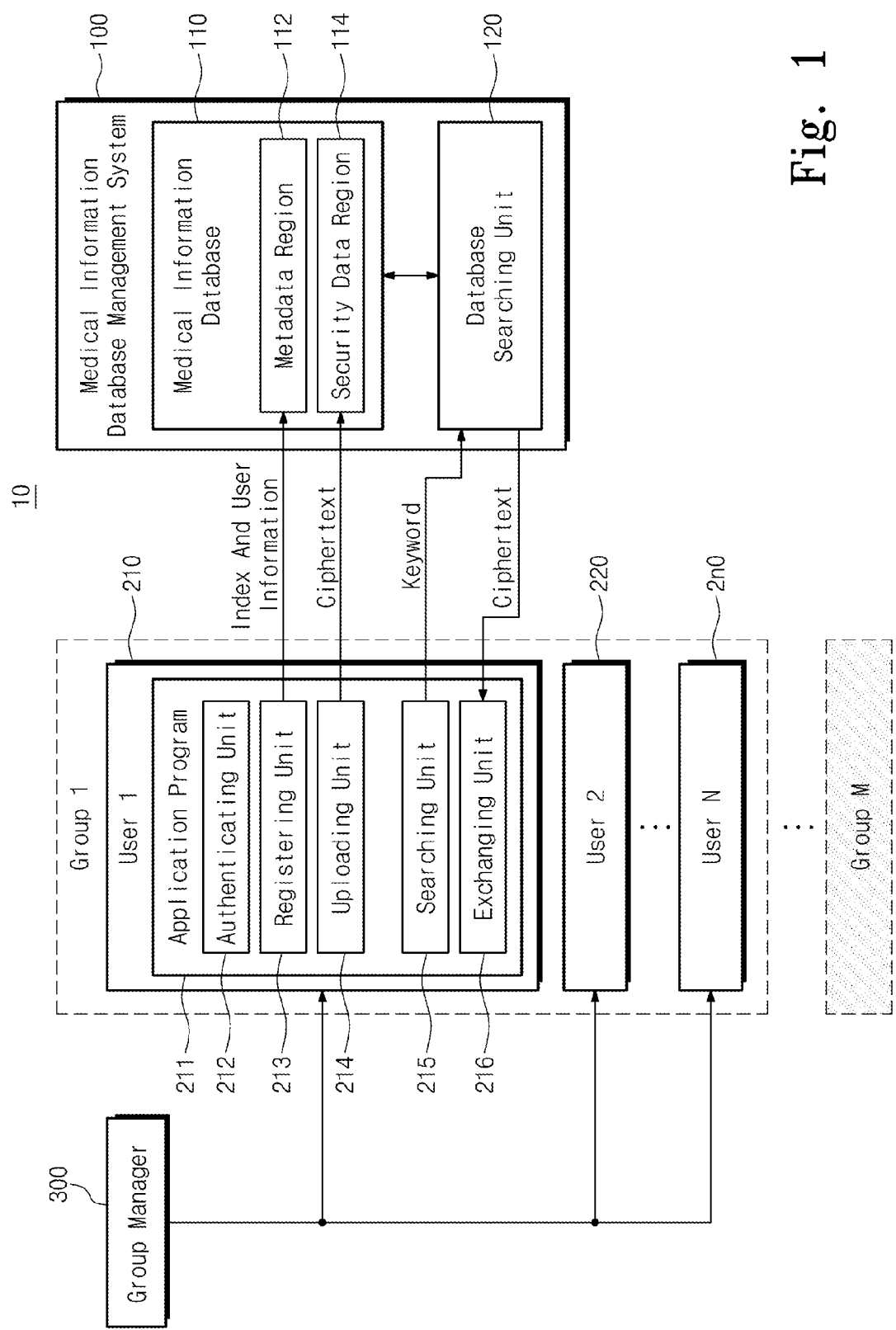
FIG. 1 is a view illustrating an exemplary medical information database operating system according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The present invention pertains to an operating system in which an authenticated user in a selected group creates, stores, and searches for medical information. Here, the medical information includes first medical information related to patient treatment information and second medical information related to patient private information. A user encrypts the first medical information by using a group key, encrypts the second medical information by using a private key, tagging by selecting representative keywords from among the medical information, and creates indexes on the basis of the tags. Encrypted medical information and indexes are stored in a database. When any user inputs keywords of a document to be searched for, a trap door is created and a database is queried by using the input keywords and indexes such that encrypted medical information may be searched for and transmitted by using indexes stored in the database.

The present invention provides an operation method of searching for desired medical information by using keywords without decoding the encrypted medical information. The present invention may be flexibly applied to various groups necessary for various medical services such as a treatment, administration, or hospital management, in order to be suitable for a medical environment.

FIG. 1 is a view illustrating an exemplary operating system for a medical information database. Referring to FIG. 1, the operating system 10 includes a medical information database managing system 100, a plurality of groups (group 1 to group M, where M is a natural number of 2 or more), and a group manager 300. Each of the plurality of groups (group 1 to group M) includes a plurality of users (for example, 210 to 2N0, where N is a natural number of 2 or more).

The medical information database managing system 100 includes a medical information database 110 and a database searching unit 120.

The medical information database 110 includes a metadata region 112 for storing indexes and user information, and a security data region 114 for storing encrypted medical information. Here, the indexes indicate keywords for a search designated by a user in order to search the medical information database 110 for medical information. In an embodiment, the indexes may be created as the representative keywords selected from among the medical information, and as tags corresponding to the medical information. In an embodiment, the indexes may be or may not be encrypted as necessary.

In an embodiment, keywords for a search may not be allowed to be created for the medical information designated as the private information.

In an embodiment, the keywords for a search may be created only for the medical information (for example, the name of a disease, prescription, etc.).

The database searching unit 120 may receive keywords from a legally authenticated user and search the medical information database 110 for the medical information corresponding to the received keywords. For example, the database searching unit 120 determines whether the received keywords are searched for from the data stored in the metadata region 112. When the indexes corresponding to the received keywords exist in the metadata region 112, the encrypted medical information corresponding to the indexes is read from the security data region 114 and may be output to the user.

Each of the users (210 to 2N0) is authenticated by the group manager 300, and then allowed to access to the medical information database management system 100. Hereinafter, description will be made for a first user 210 for convenient description.

The user 210 may execute an application program 211. Here, the application program 211 includes an authenticating unit 212, a registering unit 213, an uploading unit 214, a searching unit 215, and an exchanging unit 216.

The authenticating unit 212 may be realized to allow the user 210 to be legally authenticated by the group manager 300. For example, the authenticating unit 212 may perform authentication together with the group manager 300 by using login information of the user 210, for example, an ID and a password. When authenticated by the group manager 300, the user 210 may access to the medical information database management system 100. For example, after the authentication, the user 210 may store medical information created by the user 210 to the medical information database management system 100 or search for necessary medical information through the medical information database management system 100.

The registering unit 213 stores information related to the user 210 who creates the medical information, and indexes corresponding to the created medical information to the metadata region 112 of the medical information database 110.

The uploading unit 214 encrypts medical information created by the user 210 to store the encrypted information to the security data region 114 of the medical information database 110. Here, the medical information may be divided into first medical information (patient treatment information) and second medical information (patient private information).

The searching unit 215 outputs keywords desired to be searched.

The exchanging unit 216 receives encrypted medical information output from the database searching unit 120, and decrypts the received medical information.

Hereinafter, description will be made about a series of processes that the user 210 in the first group stores medical information to the medical information database 110, and searches for medical information by using keywords, in a medical environment including groups according to the medical information database operating system 10 as shown in FIG. 1.

First, a setup process is performed. The group manager 300 determines an encryption algorithm to be used in an encryption and search system, data types, lengths, and key information for first and second medical information to be encrypted. Also the group manager 300 registers the users by generating ids and passwords of members of each group and individual users, a key for encrypting the first medical information, group information, and a group key, storing them to a matching table, and transporting the matching table to the medical information database 110. The medical information database 110 stores the received matching table as metadata.

Second, an authentication process is performed. User authentication is performed in a scheme for inputting an ID and a password through an input window, and scanning an application program for the same values as the input id and password.

Third, an uploading process is performed. The user 210 determines medical information and representative keywords. The application program distinguishes the first medical information (patient treatment information) and the second medical information (patient private information) from the input medical information, encrypts the first medical information by using the group key, encrypts the second medical information by using the private key, created indexes by tagging the selected keywords, and transporting them to the medical information database 110.

As examples of the first medical information, namely, patient treatment information, there are diagnosis, prescription, a hospitalization date, a hospital discharge date, or a disease code, etc. As examples of the second medical information, namely, patient private information, there are a name, an age, a phone number, a resident registration number, an address, or a patient ID, etc. Here, the distinguishing of the first and second medical information may be divided with various criterions such as a policy in the group, or a medical policy, and may be defined according to a user's environment.

In an embodiment, the medical information may further include other information besides the first and second medical information. For example, the other information may be hospital administration information. Here, the hospital administration information may include all certificate management information, treatment fee management and health insurance practice, and hospital administration statistics. The all certificate management information may include medical certificate issuance related information and various certificate issuance related information. Here, the medical certificates may include general medical certificates, medical certificates for soldier, medical certificates for recuperation of government's official, various medical certificates for insurance, medical certificates for injury, medical certificates for disability, death certificates, etc. Also, the certificates may include birth certificates, stillbirth certificates, situation certificates, future treatment fee in addition, treatment confirmation, doctor's note, or certificates of authenticity. The treatment fee management and health insurance practice information may include first and second medical examinations, information about qualified recipient confirmation (for example, whether to get health insurance) at the first and second medical examination reception desk, payment of the first and second medical examination fees and reception information. The hospital administration statistics may include inventory management information, or information about patient statistics.

In an embodiment, other information may be encrypted by using a group key, the encrypted other information may be transmitted to the medical information database 110, and the encrypted other information may be decrypted by using the group key.

Fourth, a search process is performed. After completion of user authentication, when the authenticated user 210 inputs key words, an application program queries the key words to the medical information database 110, and the medical information database 110 performs a test process by using the queried keywords to transmit corresponding medical information to the application program. The application program preferably decrypts first medical information by using the group key to output to a monitor of the user 210. When the keywords queried by the user 210 are included in second medical information, they are decrypted by using a private key, and output to a monitor of the user 210 by reflecting a policy in group or a medical policy. For example, if a resident registration number is 123456-2890123, which is a keyword, and only a birth date is published by a policy, 123456-******* is output.

The medical information database operating system 10 according to the present invention may prevent exposure of medical information and protect privacy of an individual by transmitting and receiving encrypted medical information.

FIG. 2 is a flowchart illustrating an exemplary method of managing medical information according to the present invention. Referring to FIGS. 1 and 2, the method of managing medical information is as follows. Medical information including first medical information (patient treatment information) and second medical information (patient private information) will be encrypted respectively by using a group key and a private key. That is, the first medical information is encrypted with the group key and the second medical information is encrypted with the private key. Here, the group key corresponds to a group, and the private key corresponds to a user (operation S110). An index corresponding to the encrypted medical information is created (operation S120). The encrypted medical information and the created index are stored in the medical information database 100 in FIG. 1 (operation S130). A legally authenticated user searches the medical information database 110 in FIG. 1 for the encrypted medical information (operation S140). The searched medical information is decrypted by using the group key or the private key (operation S150).

According to the configuration of the present invention, construction of a medical information database is enabled to provide efficient search and systematic management as well as prevention of information leak and protection of an individual privacy.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing medical information in an operating system for a medical information database, the method comprising:
   encrypting, by a first user device, first medical information having patient treatment information by using a group key, and second medical information having patient private information by using a private key corresponding to the first user;
   generating, by the first user device, an index corresponding to the encrypted first medical information by selecting one or more representative keywords;
   storing the encrypted first and second medical information and the index to the medical information database;
   searching, by a second user device, the medical information database for the encrypted first medical information by using the index; and
   decrypting the searched encrypted first medical information by using the group key.

2. The method of claim 1, further comprising,
   performing authentication by inputting an ID and a password through an input window, by the first and second users device respectively.

3. The method of claim 1, wherein the patient treatment information comprises diagnosis, prescription, a hospitalization date, a hospital discharge date, or a disease code, and the patient private information comprises a name, an age, a phone number, a resident registration number, an address, or a patient ID.

4. The method of claim 1, wherein the second user device is identical to the first user device, the method further comprising decrypting, by the first user device, the encrypted second medical information by using the private key.

5. The method of claim 1, further comprising encrypting the index using the private key.

6. The method of claim 1, wherein the medical information further comprises other information besides the first and second medical information, the method further comprising:
   encrypting the other information using the group key;
   storing the encrypted other information in the medical information database; and
   decrypting the encrypted other information using the group key.

7. The method of claim 6, wherein the other information comprises hospital administration information.

8. The method of claim 7, wherein the hospital administration information comprises all certificate management information, treatment fee management and health insurance practice, and hospital administration statistics.

* * * * *